US006980804B2

(12) United States Patent
Maki et al.

(10) Patent No.: US 6,980,804 B2
(45) Date of Patent: Dec. 27, 2005

(54) AUTOMATIC CHANGEOVER SYSTEM FOR COMMUNICATION NETWORKS WHICH CHANGES OVER FROM ONE COMMUNICATION NETWORK TO ANOTHER, AN AUTOMATIC CHANGEOVER STATION FOR THE SAME AND AN AUTOMATIC CHANGEOVER METHOD OF COMMUNICATION NETWORKS

(75) Inventors: Hideo Maki, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 202 days.

(21) Appl. No.: 10/694,295

(22) Filed: Oct. 28, 2003

(65) Prior Publication Data

US 2004/0121768 A1 Jun. 24, 2004

(30) Foreign Application Priority Data

Nov. 27, 2002 (JP) ............................. 2002-343720

(51) Int. Cl.[7] ............................................. H04Q 7/20
(52) U.S. Cl. ..................... 455/439; 455/436; 455/437; 370/332; 370/331
(58) Field of Search ................................ 455/439, 436, 455/437; 370/332, 331

(56) References Cited

U.S. PATENT DOCUMENTS

| | | | |
|---|---|---|---|
| 6,731,949 B2 * | 5/2004 | Hamabe et al. ............. | 455/522 |
| 6,813,495 B2 | 11/2004 | Sasaki et al. | |
| 2002/0094837 A1 * | 7/2002 | Hamabe et al. ............. | 455/522 |
| 2002/0132628 A1 * | 9/2002 | Matsumoto et al. ........ | 455/456 |
| 2003/0003913 A1 * | 1/2003 | Chen et al. ................. | 455/436 |
| 2005/0165951 A1 * | 7/2005 | Wang et al. ................ | 709/237 |

FOREIGN PATENT DOCUMENTS

| | | | |
|---|---|---|---|
| JP | 9-163450 | 6/1997 | |
| JP | 9-233555 | 9/1997 | |
| JP | 2000-209644 | 7/2000 | |
| JP | 2000-278756 | 10/2000 | |
| JP | 2000-349679 A | 12/2000 | |
| JP | 2001-054168 | 2/2001 | |
| JP | 2001-128240 | 5/2001 | |
| JP | 2002-101438 A | 4/2002 | |
| JP | 2002-271436 A | 9/2002 | |
| WO | WO 02/076023 | * 9/2002 | ........... H04L 12/28 |

* cited by examiner

Primary Examiner—Danh Cong Le
(74) Attorney, Agent, or Firm—Foley & Lardner LLP

(57) ABSTRACT

An automatic changeover method of communication networks includes steps (a) to (d). In the step (a), a first station communicates with a second station through a first wireless communication network. In the step (b), the first station measures a first level fluctuation value more than once, wherein the first level fluctuation value indicates a fluctuation degree of electric field intensity of an electromagnetic wave received from the first wireless communication network. In the step (c), the first station calculates a first average level fluctuation value, wherein the first average level fluctuation value is an average of a plurality of the first level fluctuation values. In the step (d), the first station changes over from the first wireless communication network to a second wireless communication network based on the first average level fluctuation value. The first wireless communication network may be a network for a wireless LAN (Local Area Network), and the second wireless communication network may be a network for a PHS (personal Handyphone System).

32 Claims, 8 Drawing Sheets

AUTOMATIC CHANGEOVER SYSTEM FOR COMMUNICATION NETWORKS WHICH CHANGES OVER FROM ONE COMMUNICATION NETWORK TO ANOTHER, AN AUTOMATIC CHANGEOVER STATION FOR THE SAME AND AN AUTOMATIC CHANGEOVER METHOD OF COMMUNICATION NETWORKS

BACKGROUND OF THE INVENTION

1. Field of the Invention

The present invention relates to an automatic changeover system, an automatic changeover station and an automatic changeover method. More particularly, the present invention relates to an automatic changeover system for communication networks which changes over from one communication network (such as a wireless LAN) to another (such as cellular telephone network and Personal Handyphone System network), an automatic changeover station for the same and an automatic changeover method of communication networks.

2. Description of the Related Art

The wireless terminal (station) is known, in which two kinds of communication methods can be operated.

The two kinds of communication methods are exemplified in a communication method of a LAN (Local Area Network) and a communication method of a mobile telephone network such as cellular telephone network and a PHS (Personal Handyphone System) network.

When a user carries out a communication (including calling and incoming) by using the station based on the communication method of a LAN, the station accesses to a wireless LAN access point and then communicates with another station (a wireless LAN communication) through a first wireless communication network which is used for the wireless LAN When a user carries out a communication (including calling and incoming) by using the station based on the communication method of a PHS network, the station accesses to a cell station and then communicates with another station (a PHS communication) through a second wireless communication network which is used for the PHS network.

For example, when a user carries out the wireless LAN communication by using the station, the communication (line) is cut or the communication quality decreases according to the decrease of electric field intensity of electromagnetic wave in case that the station goes out of the service area in which the station can performs the wireless LAN communication.

For this reason, when the user uses the station, the user has to be conscious of the condition of the electromagnetic wave. Also, the user has to change over from the wireless LAN communication (the first wireless communication network) to the PHS communication (the second wireless communication network) by himself/herself if necessary. Therefore, the technique is desired that enables user to carry out the communication without being conscious of the condition of the electromagnetic wave.

The communication charge for the first wireless communication network (the communication charge for the wireless LAN communication) is more inexpensive than that for the second wireless communication network (that for the PHS communication). The technique is desired that the lower-cost communication method has a priority for performing the communication over other communication methods.

In conjunction with the above description, Japanese Laid Open Patent Application (JP-A-Heisei 9-23555) discloses the following a common use telephone device.

The common use telephone device includes the transmitting/receiving device which copes with a plurality of communication networks. The device includes a transmitting/receiving sections, a telephone call quality watch section, a changeover section, the other party telephone number memory section, a repeated call section and a man-machine interface section. The transmitting/receiving sections transmit/receive signals in the communication network in which the signals can be communicated. The telephone call quality watch section diagnoses the degradation of the telephone call quality based on the signals received in the transmitting/receiving section. The changeover section selects any of the transmitting/receiving sections based on the output from the telephone call quality watch section. The other party telephone number memory section stores the telephone number of other party of the communication. The repeated call section has a function which performs the repeated call to the telephone number which is stored in the other party telephone number memory section based on the output of the telephone call quality watch section and the operation of the changeover section. The man-machine interface section controls the interface for the user.

Japanese Laid Open Patent Application (JP-A 2001-128240) discloses the following a communication method of the multiple mobile terminal and that communication system.

The communication method of the multiple mobile terminal includes: carrying out a communication between a mobile terminal and another terminal in a first wireless communication network; detecting a degradation of a condition of a electromagnetic wave received by the mobile terminal; and changing over the communication between the mobile terminal and the other terminal from the first communication network to the second communication network.

Japanese Laid Open Patent Application (JP-A 2000-209644) discloses the following a multiple terminal device for a wireless communication.

The multiple terminal device for a wireless communication includes a transmitting section, a receiving section, a controlling section and a traffic data recognizing section. The transmitting section and the receiving section can perform a communication in a plurality of wireless communication networks, based on a corresponding one of a plurality of communication methods, which are different, each other. The controlling section connects a communication line of the wireless communication network selected from the plurality of the wireless communication networks through the transmitting section and the receiving section. The traffic data recognizing section recognizes a traffic data of the communication line of the wireless communication network based on a received signal received from the receiving section. Then, the controlling section selects a wireless communication network, of which a communication line is not used so much, from the plurality of the wireless communication networks based on the traffic data obtained from the traffic data recognizing section, when connecting to the communication line.

Japanese Laid Open Patent Application (JP-A 2000-278756) discloses the following a wireless communication device.

The wireless communication device includes a plurality of wireless communication means, a judging means and a connection changeover means. The plurality of wireless communication means can perform a communication by connecting to each of a plurality of wireless communication networks of which wireless communication methods are different each other. The judging means judges whether a certain condition is satisfied when one of the plurality of the wireless communication means is carrying out the communication to another party by connecting to one of the plurality of wireless communication networks, and another one of the plurality of the wireless communication means is standing by for the communication. The connection changeover means makes the one of the plurality of wireless communication means end the communication and then make the other one of the plurality of wireless communication means start the communication to the other party by connecting to another of the plurality of wireless communication networks when the judging means judges that the certain condition is satisfied.

Japanese Laid Open Patent Application (JP-A 2001-54168) discloses the following a communication method changeover wireless terminal and a communication method changeover method.

The communication method changeover wireless terminal can perform a wireless communication between a plurality of base stations of a plurality of a mobile communication systems of which kinds are different each other by changing over software. The communication method changeover wireless terminal includes a multimode transmitting-receiving means, a programmable device, a quality signal receiving means, a quality signal sending means, a module addition control means and a module release control means. The multimode transmitting-receiving means includes an antenna and a feeder cable which correspond to sending and receiving wireless signals among the plurality of base stations of the plurality of the mobile communication systems of which communication methods and frequencies are different each other. The programmable device can connect to the multimode transmitting-receiving means, and code programs regarding the various functions necessary for the communication such as the demodulation, the demodulation and filter. The quality signal receiving means controls the programmable device to receive wireless signals from the plurality of base stations of the plurality of the mobile communication systems at the substantial same time. The quality signal sending means calculating a communication quality of system (QoS) of each mobile communication system based on property data of propagation circumstances, which is detected in accordance with the signals received from each base station by control of the quality signal receiving means, module addition control means, and system specific property data of each mobile communication system. Then, the quality signal sending means sends the communication quality of system (QoS) of each mobile communication system to the base station which is in communication. The module addition control means adds the control of a software module, which realizes the communication function for another mobile communication system, to the control of the programmable device, when changing over from the mobile communication system to the other mobile communication system. The module release control means releases the software module, which realizes the control of the unnecessary mobile communication function, from the control of the programmable device.

Japanese Laid Open Patent Application (JP-A-Heisei 9-163450) discloses the following a mobile communication multiple terminal.

The mobile communication multiple terminal has transmitting-receiving functions of two different mobile communication systems. The mobile communication multiple terminal includes the means which automatically or manually changes over the mobile communication systems for awaiting the signal.

SUMMARY OF THE INVENTION

Therefore, an object of the present invention is to provide an automatic changeover system, an automatic changeover station and an automatic changeover method which enables users to carry out the communication without being conscious of the condition of the electromagnetic wave.

Another object of the present invention is to provide an automatic changeover system, an automatic changeover station and an automatic changeover method which the lower-cost communication method has a priority for performing the communication over other communication methods.

In order to achieve an aspect of the present invention, the present invention provides an automatic changeover method of communication networks including: (a) communicating with a second station by a first station through a first wireless communication network; (b) measuring a first level fluctuation value more than once by the first station, wherein the first level fluctuation value indicates a fluctuation degree of electric field intensity of an electromagnetic wave received from the first wireless communication network; (c) calculating a first average level fluctuation value by the first station, wherein the first average level fluctuation value is an average of a plurality of the first level fluctuation values; and (d) changing over from the first wireless communication network to a second wireless communication network by the first station, based on the first average level fluctuation value.

In the method of the present invention, the first wireless communication network is a network for a wireless LAN (Local Area Network), and the second wireless communication network is a network for a PHS (personal Handyphone System).

In the method of the present invention, the step (d) including: (d1) comparing the first average level fluctuation value with a first setting value by the first station; and (d2) changing over from the first wireless communication network to the second wireless communication network by the first station based on a first result of the comparison.

In the method of the present invention, the step (d2) including: (d21) sending a first communication request signal to the second station by the first station through the second wireless communication network based on the first result of the comparison, wherein the first communication request signal indicates a request for a changeover from the first wireless communication network to the second wireless communication network; and (d22) ending a communication through the first wireless communication network and starting a communication with the second station by the first station through the second wireless communication network, when the first station receives a first communication answer signal from the second station through the second wireless communication network, wherein the first communication answer signal indicates an answer that the second station can communicate through the second wireless communication network.

The method of the present invention, further including: (e) measuring a second level fluctuation value more than once by the first station, wherein the second level fluctuation value indicates a fluctuation degree of electric field intensity of an electromagnetic wave received from the first wireless communication network during communicating with the second station through the second wireless communication network; (f) calculating a second average level fluctuation value by the first station, wherein the second average level fluctuation value is an average of a plurality of the second level fluctuation values; (g) sending a second communication request signal to the second station by the first station through the first wireless communication network based on the second average level fluctuation value, wherein the second communication request signal indicates an request for the changeover from the second wireless communication network to the first wireless communication network; and (h) ending a communication through the second wireless communication network and starting a communication with the second station by the first station through the first wireless communication network, when the first station receives a second communication answer signal from the second station through the first wireless communication network, wherein the second communication answer signal indicates an answer that the second station can communicate through the first wireless communication network.

In the method of the present invention, the step (a) including: (a1) measuring a third level fluctuation value more than once by the first station, wherein the third level fluctuation value indicates a fluctuation degree of electric field intensity of an electromagnetic wave received from the first wireless communication network before communicating with the second station; (a2) calculating a third average level fluctuation value by the first station, wherein the third average level fluctuation value is an average of a plurality of the third level fluctuation values; (a3) sending a first inquiry signal to the second station by the first station through the first wireless communication network based on the third average level fluctuation value, wherein the first inquiry signal indicates an inquiry whether or not the second station can communicate through the first wireless communication network; and (a4) starting a communication with the second station by the first station through the first wireless communication network, when the first station receives a first answer signal from the second station through the first wireless communication network, wherein the first answer signal indicates an answer that the second station can communicate through the first wireless communication network.

In the method of the present invention, the step (d) including: (d3) comparing the first average level fluctuation value with a first setting value by the first station; and (d4) changing over from the first wireless communication network to the second wireless communication network by the first station based on a first result of the comparison.

In the method of the present invention, the step (d4) including: (d41) sending a first communication request signal to the second station by the first station through the second wireless communication network based on the first result of the comparison, wherein the first communication request signal indicates a request for a changeover from the first wireless communication network to the second wireless communication network; and (d42) ending a communication through the first wireless communication network and starting a communication with the second station by the first station through the second wireless communication network, when the first station receives a first communication answer signal from the second station through the second wireless communication network, wherein the first communication answer signal indicates an answer that the second station can communicate through the second wireless communication network.

In the of the present invention, further including: (i) measuring a second level fluctuation value more than once by the first station, wherein the second level fluctuation value indicates a fluctuation degree of electric field intensity of an electromagnetic wave received from the first wireless communication network during communicating with the second station through the second wireless communication network; (j) calculating a second average level fluctuation value by the first station, wherein the second average level fluctuation value is an average of a plurality of the second level fluctuation values; (k) sending a second communication request signal to the second station by the first station through the first wireless communication network based on the second average level fluctuation value, wherein the second communication request signal indicates an request for the changeover from the second wireless communication network to the first wireless communication network; and (l) ending a communication through the second wireless communication network and starting a communication with the second station by the first station through the first wireless communication network, when the first station receives a second communication answer signal from the second station through the first wireless communication network, wherein the second communication answer signal indicates an answer that the second station can communicate through the first wireless communication network.

In the method of the present invention, the step (a) including: (a5) measuring a third level fluctuation value more than once by the first station, wherein the third level fluctuation value indicates a fluctuation degree of electric field intensity of an electromagnetic wave received from the first wireless communication network before communicating with the second station; (a6) calculating a third average level fluctuation value by the first station, wherein the third average level fluctuation value is an average of a plurality of the third level fluctuation values; (a7) sending a first inquiry signal to the second station by the first station through the first wireless communication network based on the third average level fluctuation value, wherein the first inquiry signal indicates an inquiry whether or not the second station can communicate through the first wireless communication network; and (a8) starting a communication with the second station by the first station through the first wireless communication network, when the first station receives a first answer signal from the second station through the first wireless communication network, wherein the first answer signal indicates an answer that the second station can communicate through the first wireless communication network.

An automatic changeover method of communication networks including: (m) measuring a first level fluctuation value more than once by a first station, wherein the first level fluctuation value indicates a fluctuation degree of electric field intensity of an electromagnetic wave received from a first wireless communication network; (n) calculating a first average level fluctuation value by the first station, wherein the first average level fluctuation value is an average of a plurality of the first level fluctuation values; (o) sending a first inquiry signal to a second station by the first station through the first wireless communication network based on the first average level fluctuation value, wherein the first inquiry signal indicates an inquiry whether or not the second station can communicate through the first wireless communication network; (p) communicating with the second station by the first station through the first wireless communication network, when the first station receives a first answer signal from the second station through the first wireless communication network, wherein the first answer signal indicates an answer that the second station can communicate through the first wireless communication network; and (q) communicating with the second station by the first station through a second wireless communication network, when the first station receives a second answer signal from the second station through the first wireless communication network, wherein the second answer signal indicates an answer that the second station cannot communicate through the first wireless communication network, or when the first station does not receives any answer signal within a certain time period.

In the method of the present invention, the first wireless communication network is a network for a wireless LAN (Local Area Network), and the second wireless communication network is a network for a PHS (personal Handyphone System).

In the method of the present invention, the step (g) including: (o1) comparing the first average level fluctuation value with a first setting value by the first station; and (o2) sending a first inquiry signal to a second station by the first station through the first wireless communication network based on a result of the comparison.

In order to achieve another aspect of the present invention, the present invention provides a computer program product embodied on a computer-readable medium and including code that, when executed, causes a computer of a first station to perform the following: (a) communicating with a second station through a first wireless communication network; (b) measuring a first level fluctuation value more than once, wherein the first level fluctuation value indicates a fluctuation degree of electric field intensity of an electromagnetic wave received from the first wireless communication network; (c) calculating a first average level fluctuation value, wherein the first average level fluctuation value is an average of a plurality of the first level fluctuation values; (d) changing over from the first wireless communication network to a second wireless communication network, based on the first average level fluctuation value. In the computer program product of the present invention, the first wireless communication network is a network for a wireless LAN (Local Area Network), and the second wireless communication network is a network for a PHS (personal Handyphone System).

In the computer program product of the present invention, the step (d) including: (d1) comparing the first average level fluctuation value with a first setting value; and (d2) changing over from the first wireless communication network to the second wireless communication network based on a first result of the comparison.

In the computer program product of the present invention, the step (d2) including: (d21) sending a first communication request signal to the second station through the second wireless communication network based on the first result of the comparison, wherein the first communication request signal indicates a request for a changeover from the first wireless communication network to the second wireless communication network; (d22) ending a communication through the first wireless communication network and starting a communication with the second station through the second wireless communication network, when the first station receives a first communication answer signal from the second station through the second wireless communication network, wherein the first communication answer signal indicates an answer that the second station can communicate through the second wireless communication network.

The computer program product of the present invention, further including: (e) measuring a second level fluctuation value more than once, wherein the second level fluctuation value indicates a fluctuation degree of electric field intensity of an electromagnetic wave received from the first wireless communication network during communicating with the second station through the second wireless communication network; (f) calculating a second average level fluctuation value, wherein the second average level fluctuation value is an average of a plurality of the second level fluctuation values; (g) sending a second communication request signal to the second station through the first wireless communication network based on the second average level fluctuation value, wherein the second communication request signal indicates an request for the changeover from the second wireless communication network to the first wireless communication network; and (h) ending a communication through the second wireless communication network and starting a communication with the second station through the first wireless communication network, when the first station receives a second communication answer signal from the second station through the first wireless communication network, wherein the second communication answer signal indicates an answer that the second station can communicate through the first wireless communication network.

In the computer program product of the present invention, the step (a) including: (a1) measuring a third level fluctuation value more than once, wherein the third level fluctuation value indicates a fluctuation degree of electric field intensity of an electromagnetic wave received from the first wireless communication network before communicating with the second station; (a2) calculating a third average level fluctuation value, wherein the third average level fluctuation value is an average of a plurality of the third level fluctuation values; (a3) sending a first inquiry signal to the second station through the first wireless communication network based on the third average level fluctuation value, wherein the first inquiry signal indicates an inquiry whether or not the second station can communicate through the first wireless communication network; and (a4) starting a communication with the second station through the first wireless communication network, when the first station receives a first answer signal from the second station through the first wireless communication network, wherein the first answer signal indicates an answer that the second station can communicate through the first wireless communication network.

In the computer program product of the present invention, the step (d) including: (d3) comparing the first average level fluctuation value with a first setting value; and (d4) changing over from the first wireless communication network to the second wireless communication network based on a first result of the comparison.

In the computer program product of the present invention, the step (d4) including: (d41) sending a first communication request signal to the second station through the second wireless communication network based on the first result of the comparison, wherein the first communication request signal indicates a request for a changeover from the first wireless communication network to the second wireless communication network; and (d42) ending a communication through the first wireless communication network and starting a communication with the second station through the second wireless communication network, when the first station receives a first communication answer signal from the second station through the second wireless communication network, wherein the first communication answer signal indicates an answer that the second station can communicate through the second wireless communication network.

The computer program product of the present invention, further including: (i) measuring a second level fluctuation value more than once, wherein the second level fluctuation value indicates a fluctuation degree of electric field intensity of an electromagnetic wave received from the first wireless communication network during communicating with the second station through the second wireless communication network; (j) calculating a second average level fluctuation value, wherein the second average level fluctuation value is an average of a plurality of the second level fluctuation values; (k) sending a second communication request signal to the second station through the first wireless communication network based on the second average level fluctuation value, wherein the second communication request signal indicates an request for the changeover from the second wireless communication network to the first wireless communication network; (l) ending a communication through the second wireless communication network and starting a communication with the second station through the first wireless communication network, when the first station receives a second communication answer signal from the second station through the first wireless communication network, wherein the second communication answer signal indicates an answer that the second station can communicate through the first wireless communication network.

In the computer program product of the present invention, the step (a) including: (a5) measuring a third level fluctuation value more than once, wherein the third level fluctuation value indicates a fluctuation degree of electric field intensity of an electromagnetic wave received from the first wireless communication network before communicating with the second station; (a6) calculating a third average level fluctuation value, wherein the third average level fluctuation value is an average of a plurality of the third level fluctuation values; (a7) sending a first inquiry signal to the second station through the first wireless communication network based on the third average level fluctuation value, wherein the first inquiry signal indicates an inquiry whether or not the second station can communicate through the first wireless communication network; and (a8) starting a communication with the second station through the first wireless communication network, when the first station receives a first answer signal from the second station through the first wireless communication network, wherein the first answer signal indicates an answer that the second station can communicate through the first wireless communication network.

A computer program product embodied on a computer-readable medium and including code that, when executed, causes a computer of a first station to perform the following: (m) measuring a first level fluctuation value more than once, wherein the first level fluctuation value indicates a fluctuation degree of electric field intensity of an electromagnetic wave received from a first wireless communication network; (n) calculating a first average level fluctuation value, wherein the first average level fluctuation value is an average of a plurality of the first level fluctuation values; (o) sending a first inquiry signal to a second station through the first wireless communication network based on the first average level fluctuation value, wherein the first inquiry signal indicates an inquiry whether or not the second station can communicate through the first wireless communication network; (p) communicating with the second station through the first wireless communication network, when the first station receives a first answer signal from the second station through the first wireless communication network, wherein the first answer signal indicates an answer that the second station can communicate through the first wireless communication network; and (q) communicating with the second station through a second wireless communication network, when the first station receives a second answer signal from the second station through the first wireless communication network, wherein the second answer signal indicates an answer that the second station cannot communicate through the first wireless communication network, or when the first station does not receives any answer signal within a certain time period.

In the computer program product of the present invention, the first wireless communication network is a network for a wireless LAN (Local Area Network), and the second wireless communication network is a network for a PHS (personal Handyphone System).

In the computer program product of the present invention, the step (g) including: (o1) comparing the first average level fluctuation value with a first setting value; and (o2) sending a first inquiry signal to a second station through the first wireless communication network based on a result of the comparison.

In order to achieve still another aspect of the present invention, the present invention provides an automatic changeover system for communication networks including: a first station; and a second station. The first station communicates with the second station through a first wireless communication network, measures a first level fluctuation value more than once, calculates a first average level fluctuation value, and changes over from the first wireless communication network to a second wireless communication network based on the first average level fluctuation value. The first level fluctuation value indicates a fluctuation degree of electric field intensity of an electromagnetic wave received from the first wireless communication network. The first average level fluctuation value is an average of a plurality of the first level fluctuation values. The first wireless communication network is a network for a wireless LAN (Local Area Network), and the second wireless communication network is a network for a PHS (personal Handyphone System).

In order to achieve yet still another aspect of the present invention, the present invention provides an automatic changeover station for communication networks including: a first communication section, a first watching section, a second communication section and a control section. The first communication section communicates with another station through a first wireless communication network. The first watching section measures a first level fluctuation value more than once, and calculates a first average level fluctuation value, wherein the first level fluctuation value indicates a fluctuation degree of electric field intensity of an electromagnetic wave received from the first wireless communication network and the first average level fluctuation value is an average of a plurality of the first level fluctuation values. The second communication section has a function to communicate with the another station through a second wireless communication network. The control section controls the first communication section and the second communication section to change over from the first wireless communication network to the second wireless communication network based on the first average level fluctuation value.

In the automatic changeover station of the present invention, the first wireless communication network is a network for a wireless LAN (Local Area Network), and the second wireless communication network is a network for a PHS (personal Handyphone System).

In the automatic changeover station of the present invention, the control section compares the first average level fluctuation value with a first setting value. The control section controls the first communication section and the second communication section such that the first communication section cuts the communication with the another station through the first wireless communication network, and the second communication section starts communication with the another station through the second wireless communication network based on a first result of the comparison.

In the automatic changeover station of the present invention, the second communication section sends a first communication request signal to the another station through the second wireless communication network based on the first result of the comparison. The first communication request signal indicates a request for a changeover from the first wireless communication network to the second wireless communication network. The first communication section cuts a communication through the first wireless communication network, when the second station receives a first communication answer signal from the another station through the second wireless communication network, wherein the first communication answer signal indicates an answer that the second station can communicate through the second wireless communication network. The second communication section starts a communication with the another station through the second wireless communication network.

In the automatic changeover station of the present invention, the first watching section measures a second level fluctuation value more than once, wherein the second level fluctuation value indicates a fluctuation degree of electric field intensity of an electromagnetic wave received from the first wireless communication network during communicating with the another station through the second wireless communication network. The first watching section calculates a second average level fluctuation value by the first station, wherein the second average level fluctuation value is an average of a plurality of the second level fluctuation values. The control section controls the first communication section such that the first communication section sends a second communication request signal to the another station through the first wireless communication network based on the second average level fluctuation value, wherein the second communication request signal indicates an request for the changeover from the second wireless communication network to the first wireless communication network. The control section controls the second communication section such that the second communication section ends a communication through the second wireless communication network and starts a communication with the another station through the first wireless communication network, when first communication section receives a second communication answer signal from the another station through the first wireless communication network, wherein the second communication answer signal indicates an answer that the another station can communicate through the first wireless communication network.

DESCRIPTION OF THE PREFERRED EMBODIMENTS

Embodiments of an automatic changeover system for communication networks and an automatic changeover method of communication networks according to the present invention will be described below with reference to the attached drawings.

Figure 1:
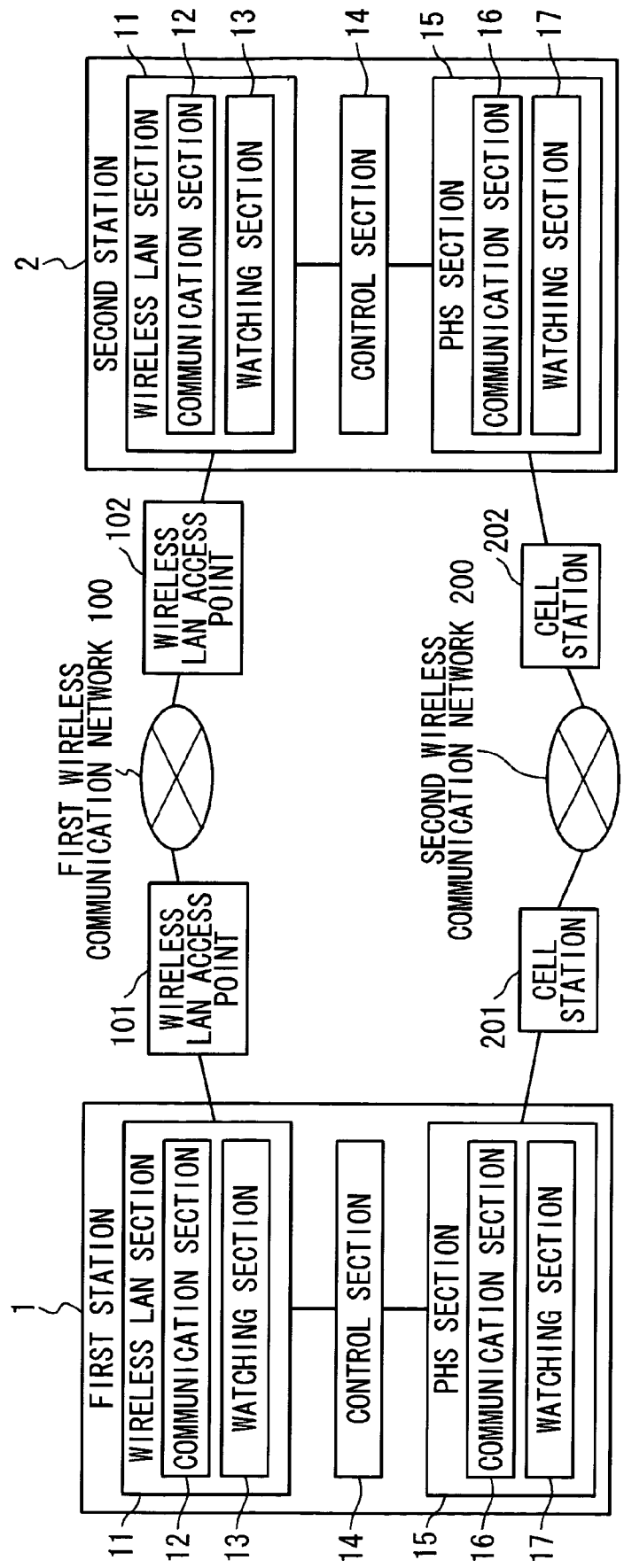
FIG. 1 is a view showing a block diagram of the embodiments of the automatic changeover system for communication networks of the present invention.

The automatic changeover method of communication networks according to the present invention is applied to the automatic changeover system for communication networks as shown in FIG. 1.

FIG. 1 is a view showing a block diagram of this embodiment of the automatic changeover system for communication networks of the present invention. The automatic changeover system includes a first station (an automatic changeover station) 1 and a second station (an automatic changeover station) 2.

Here, the station is exemplified in a mobile computer, a cellular telephone, a PDA (Personal Digital Assistant) and a PHS (Personal Handyphone System).

The first station 1 is connected to one communication network, here a wireless LAN (local area network). The first station 1 is connected to a wireless LAN access point 101 of a plurality of wireless LAN access points, when carrying out a communication (a wireless LAN communication) with the second station 2 through a first wireless communication network 100 which is applied to the wireless LAN. At that time, the second station 2 is connected a wireless LAN access point 102 of the plurality of wireless LAN access points.

The first station 1 is also connected to another communication network, here PHS (Personal Handyphone System) network. The first station 1 is connected to a cell station 201 of a plurality of cell stations, when carrying out a communication (a PHS communication) with the second station 2 through a second wireless communication network 200 which is applied to the PHS. At that time, the second station 2 is connected a cell station 202 of the plurality of cell stations.

The other communication network may be a cellular telephone network.

The communication charge for using the first wireless communication network 100 (the communication charge of the wireless LAN communication) is more inexpensive (cheaper) than the communication charge for using the second wireless communication network 200 (the communication charge of the PHS communication).

Each of the first station 1 and the second station 2 includes a wireless LAN section 11, a control section 14 and a PHS section 15. The wireless LAN section 11 includes a communication section 12 and a watching section 13. The PHS section 15 includes a communication section 16 and a watching section 17.

(The First Embodiment)

Figure 2:
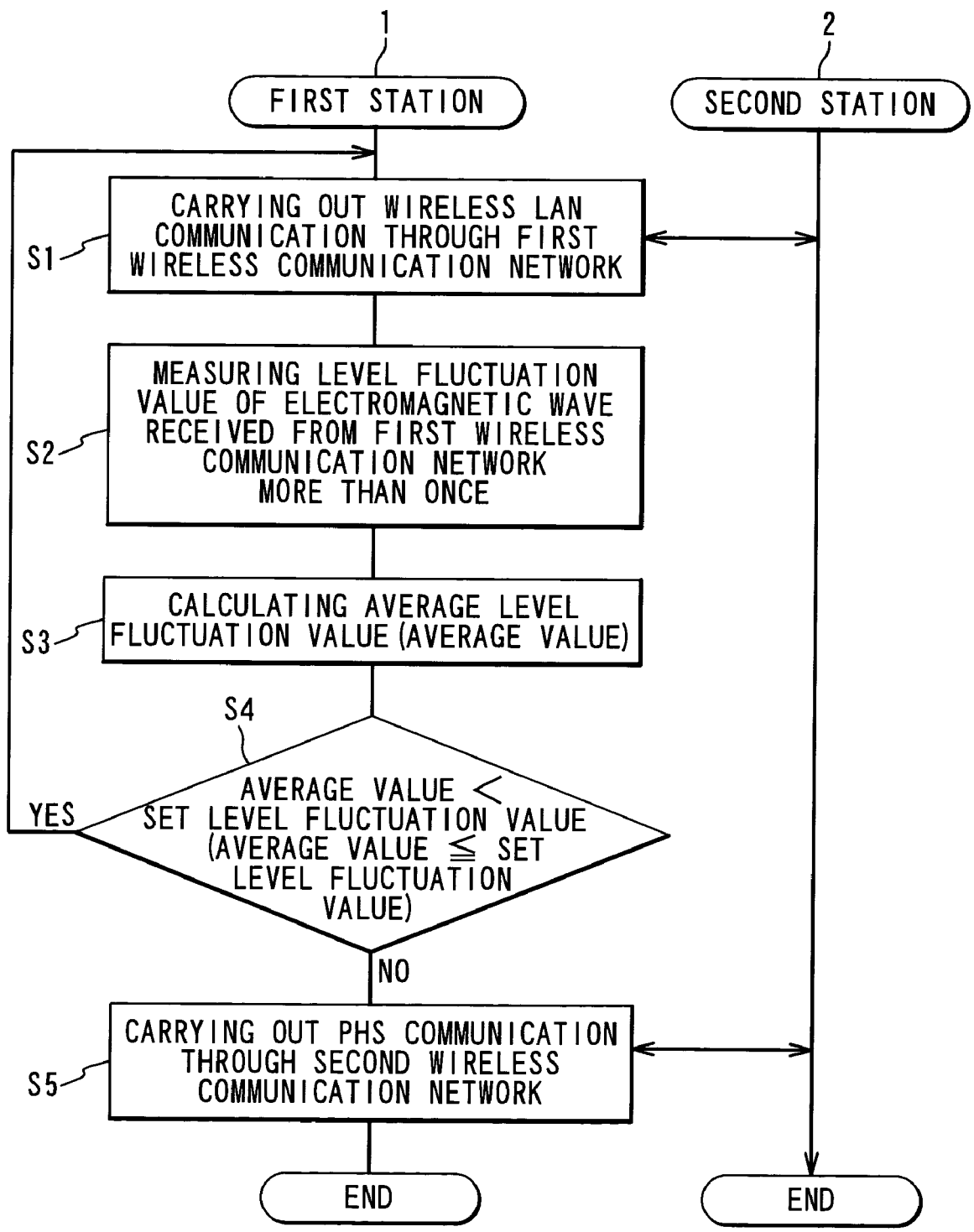
FIG. 2 is a view showing a flowchart of first embodiment of the automatic changeover method of communication networks according to the present invention.

FIG. 2 is a view showing a flowchart of this embodiment of the automatic changeover method of communication networks (the operation of the automatic changeover system) according to the present invention. The wireless LAN section 11 (the communication section 12) of the first station 1 carries out the wireless LAN communication with the second station 2 through the first wireless communication network 100 as a communication network (step S1).

During the step S1, the wireless LAN section 11 (the watching section 13) of the first station 1 measures a level fluctuation value, which indicates the degree of the fluctuation of the electric field intensity of electromagnetic wave received from the first wireless communication network 100, more than once (step S2). Then, the wireless LAN section 11 (the watching section 13) calculates an average level fluctuation value (an average value) based on the plurality of the level fluctuation values measured in the step S2 (step S3). The control section 14 of the first station 1 compares the average level fluctuation value with a set level fluctuation value (step S4).

When the average level fluctuation value is less than the set level fluctuation value (step S4—YES) based on the comparison result, the wireless LAN section 11 (the communication section 12) of the first station 1 continues the wireless LAN communication with the second station 2 through the first wireless communication network 100 (step S1).

When the average level fluctuation value is equal to or more than the set level fluctuation value (step S4—NO) based on the comparison result, the control section 14 of the first station 1 changes over from the first wireless communication network 100 to the second wireless communication network 200. The PHS section 15 (the communication section 16) carries out the PHS communication with the second station 2 through the second wireless communication network 200 (step S5).

As for the judgement in the step S4, it is easy to realize that the first station 1 performs the step S1 when the average level fluctuation value is equal to or less than the set level fluctuation value (step S4—YES), and the step S5 when the average level fluctuation value is more than the set level fluctuation value (step S4—NO).

In this way, the automatic changeover method of communication networks of the first embodiment according to the present invention can automatically change over from the wireless LAN communication (the first wireless communication network 100) to the PHS communication (the second wireless communication network 200), when the first station 1 goes out of the service area in which the station can performs the wireless LAN communication with another station and when the electric field intensity of electromagnetic wave from the first wireless communication network 100 decreases. As a result, a user of the first station 1 can carry out the communication without being conscious of the condition of the electromagnetic wave.

The automatic changeover method of communication networks of the first embodiment changes over from the wireless LAN communication (the first wireless communication network 100) to the PHS communication (the second wireless communication network 200). Therefore, until the electric field intensity of electromagnetic wave from the first wireless communication network 100 decreases, the user of the first station can use preferentially the wireless LAN communication, of which the communication charge is more inexpensive (cheaper) than that of the PHS communication. That is, the lower-cost communication method has a priority for performing the communication over other communication methods.

The reason for measuring the level fluctuation value more than once is as follows. When the measurement of the level fluctuation value is done only once, there is a case that the measured level fluctuation value is larger than the real level fluctuation value because of the influence of the noise from the outside. When the station 1 judges that the level fluctuation value is more than (or equal to) the set level fluctuation value without calculating the average level fluctuation value, there is a possibility to change over from the first wireless communication network 100 to the second wireless communication network 200 by mistake. In the automatic changeover method of communication networks of the first embodiment, the station measures the level fluctuation value more than once and changes over from the first wireless communication network 100 to the second wireless communication network 200 when the average level fluctuation value is more than (or equal to) the set fluctuation level. Therefore, the method has higher reliability of the comparison between the measurement value (the level fluctuation values and the set value (the set fluctuation value) and the judgement.

(The Second Embodiment)

Figure 3:
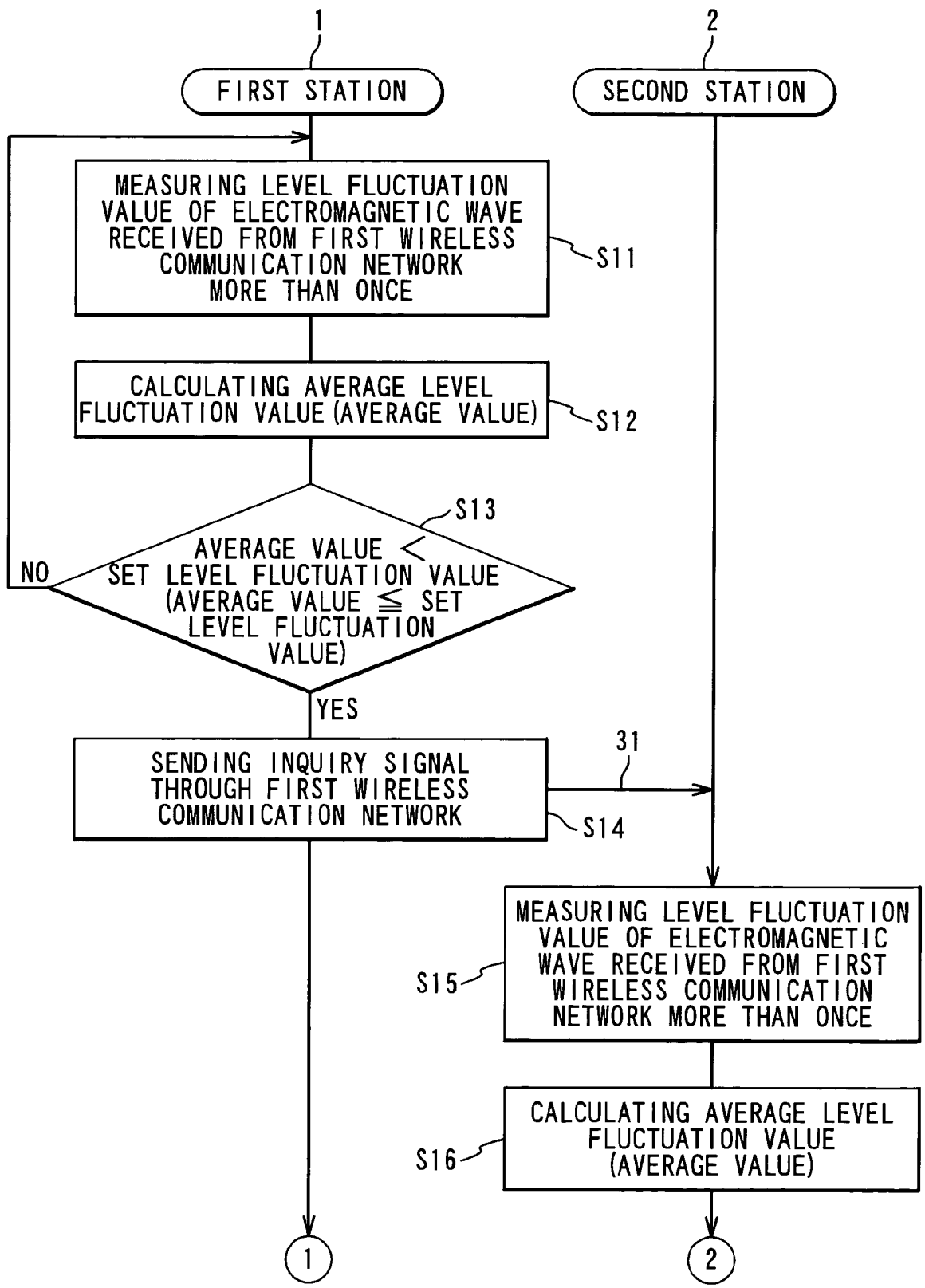
FIGS. 3 and 4 are views showing flowcharts of second embodiment of the automatic changeover method of communication networks according to the present invention.
Figure 4:
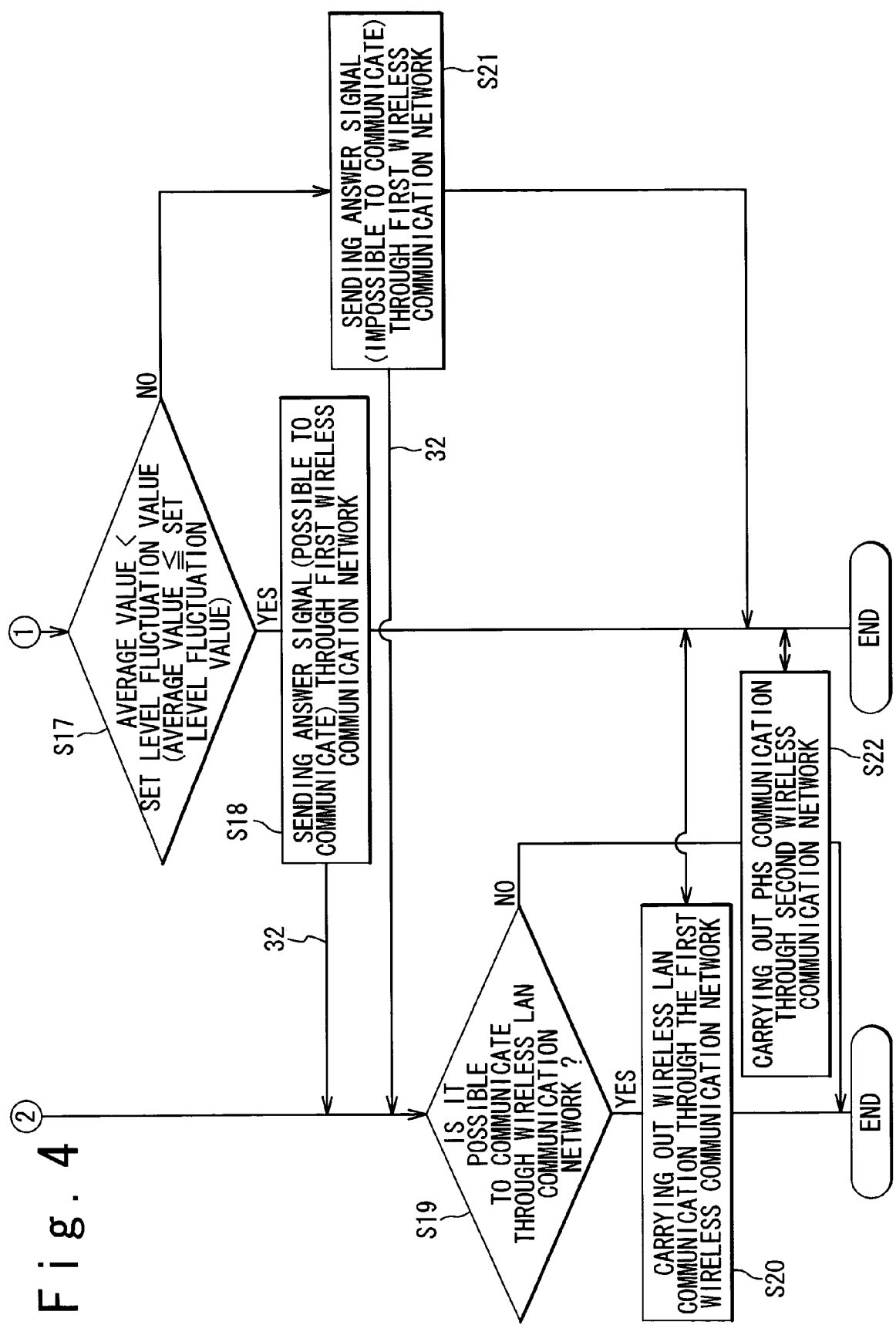

FIGS. 3 and 4 are views showing flowcharts of this embodiment of the automatic changeover method of communication networks (the operation of the automatic changeover system) according to the present invention.

The first station 1 has not carried out the communication with the second station 2 yet. The wireless LAN section 11 (the watching section 13) of the first station 1 measures the level fluctuation value, which indicates the degree of the fluctuation of the electric field intensity of electromagnetic wave received from the first wireless communication network 100, more than once (step S11). Then, the wireless LAN section 11 (the watching section 13) of the first station 1 calculates an average level fluctuation value (an average value) based on the plurality of the level fluctuation values measured in the step S11 (step S12). The control section 14 of the first station 1 compares the average level fluctuation value with a set level fluctuation value (step S13).

When the average level fluctuation value is less than the set level fluctuation value (step S13—YES) based on the comparison result, the first station 1 carries out the step S11.

When the average level fluctuation value is equal to or more than the set level fluctuation value (step S13—NO) based on the comparison result, the control section 14 of the first station 1 controls the wireless LAN section 11 (the communication section 12) such that the wireless LAN section 11 sends an inquiry signal 31 to the second station 2 through the first wireless communication network 100 (step S14). The inquiry signal 31 indicates an inquiry whether or not the second station 2 can communicate with the first station 1 through the first wireless communication network 100.

The wireless LAN section 11 (the communication section 13) of the second station 2 receives the inquiry signal 31 sent by the first station 1. Then, the wireless LAN section 11 of the second station 2 measures the level fluctuation value, which indicates the degree of the fluctuation of the electric field intensity of electromagnetic wave received from the first wireless communication network 100, more than once (step S15). Then, the wireless LAN section 11 (the watching section 13) of the second station 2 calculates an average level fluctuation value (an average value) based on the plurality of the level fluctuation values measured in the step S15 (step S16). The control section 14 of the second station 2 compares the average level fluctuation value with a set level fluctuation value (step S17).

When the average level fluctuation value is equal to or more than the set level fluctuation value (step S17—NO) based on the comparison result, the control section 14 of the second station 2 controls the wireless LAN section 11 (the communication section 12) such that the wireless LAN section 11 sends an answer signal 32 to the first station 1 through the first wireless communication network 100 (step S18). In this case, the answer signal 32 indicates an answer that the second station 2 can communicate with the first station 1 through the first wireless communication network 100.

When the answer signal 32 indicates that the second station 2 can communicate with the first station 1 (step S19—YES), the wireless LAN section 11 (the communication section 12) of the first station 1 carries out the wireless LAN communication with the second station 2 through the first wireless communication network 100 (step S20).

When the average level fluctuation value is less than the set level fluctuation value (step S17—YES) based on the comparison result, the control section 14 of the second station 2 controls the wireless LAN section 11 (the communication section 12) such that the wireless LAN section 11 sends an answer signal 32 to the first station 1 through the first wireless communication network 100 (step S21). In this case, the answer signal 32 indicates an answer that the second station 2 can not communicate with the first station 1 through the first wireless communication network 100.

When the answer signal 32 indicates that the second station 2 can not communicate with the first station 1 or when the first station 1 can not receive the answer signal 32 within a certain time period (step S19—NO), the control section 14 of the first station 1 changes over from the first wireless communication network 100 to the second wireless communication network 200. The PHS section 15 (the communication section 16) carries out the PHS communication with the second station 2 through the second wireless communication network 200 (step S22).

As for the judgement in the step S13, it is easy to realize that the first station 1 performs the step S14 when the average level fluctuation value is equal to or less than the set level fluctuation value (step S13—YES), and the step S11 when the average level fluctuation value is more than the set level fluctuation value (step S13—NO).

As for the judgement in the step S17, it is easy to realize that the second station 2 performs the step S18 when the average level fluctuation value is equal to or less than the set level fluctuation value (step S17—YES), and the step S21 when the average level fluctuation value is more than the set level fluctuation value (step S17—NO).

In this way, the automatic changeover method of communication networks of the second embodiment according to the present invention can automatically selects the wireless LAN communication (the first wireless communication network 100) preferentially rather than the PHS communication (the second wireless communication network 200), when the first and second station are inside the service area in which the station. Also, the method according to the present invention can automatically changes over from the wireless LAN communication to the PHS communication (selects the PHS communication), when the second station is outside the service area and the electric field intensity of electromagnetic wave from the first wireless communication network 100 decreases. As a result, a user of the first station 1 can carry out the communication without being conscious of the condition of the electromagnetic wave.

The automatic changeover method of communication networks of the second embodiment changes over from the wireless LAN communication (the first wireless communication network 100) to the PHS communication (the second wireless communication network 200). Therefore, until the electric field intensity of electromagnetic wave from the first wireless communication network 100 decreases, the user of the first station can use preferentially the wireless LAN communication, of which the communication charge is more inexpensive (cheaper) than that of the PHS communication. That is, the lower-cost communication method has a priority for performing the communication over other communication methods.

The automatic changeover method of communication networks of the second embodiment has higher reliability of the comparison between the measurement value (the level fluctuation values and the set value (the set fluctuation value) and the judgement, same as the first embodiment.

(The Third Embodiment)

Figure 5:
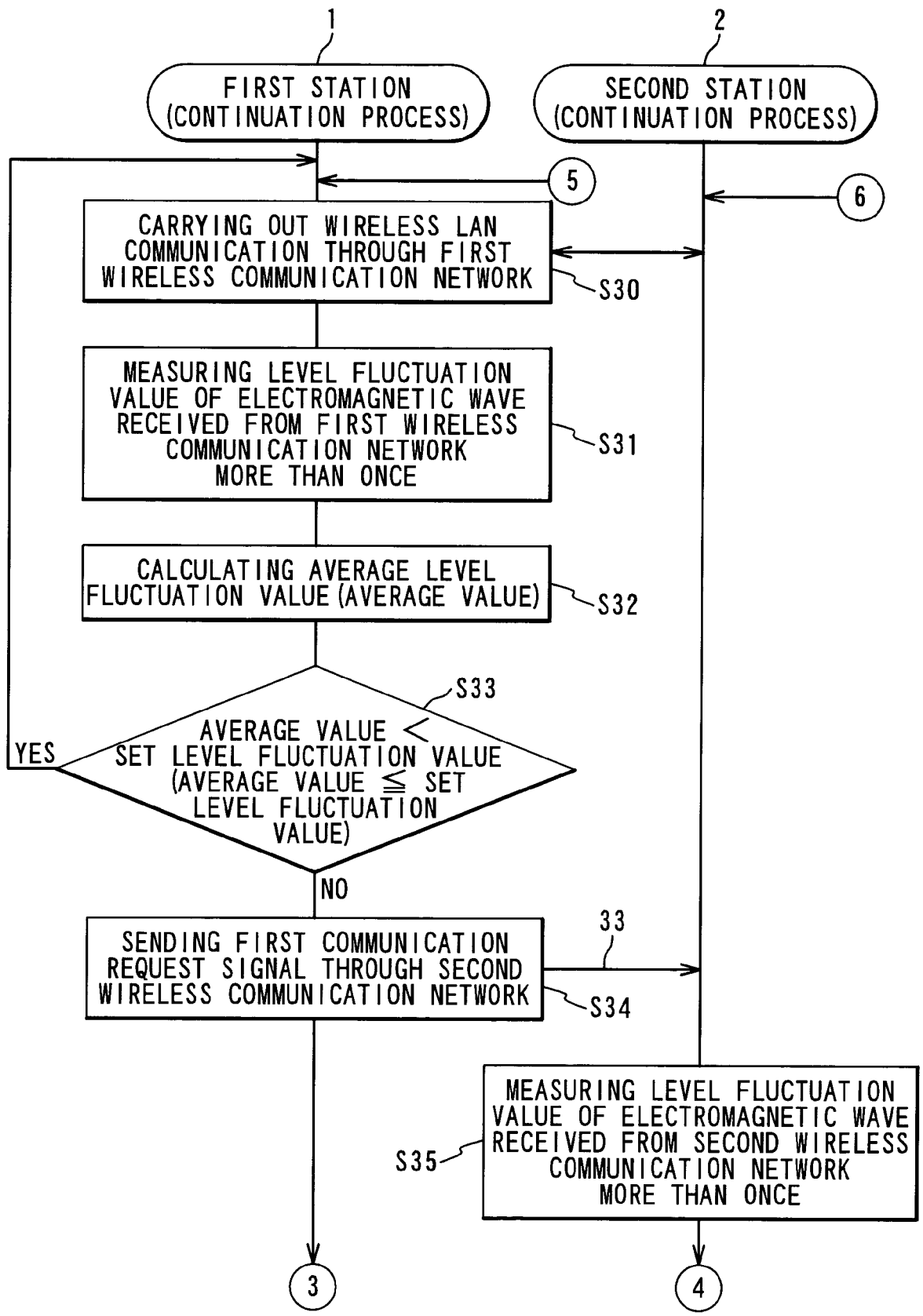
FIGS. 5 and 6 are views showing flowcharts of third embodiment of the automatic changeover method of communication networks according to the present invention.
Figure 6:
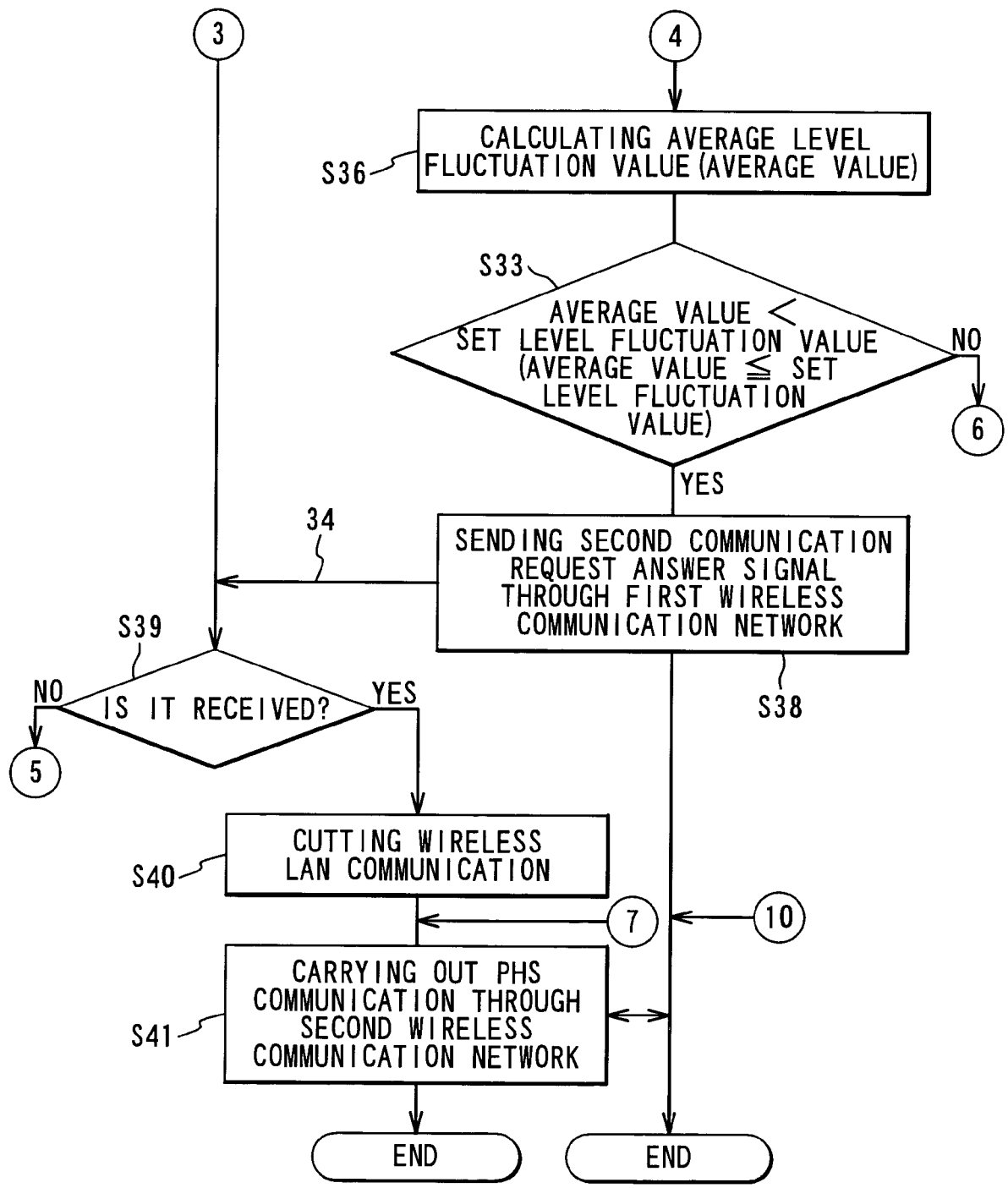

FIGS. 5 and 6 are views showing flowcharts of this embodiment of the automatic changeover method of communication networks (the operation (the continuation process) of the automatic changeover system) according to the present invention. The wireless LAN section 11 (the communication section 12) of the first station 1 carries out the wireless LAN communication with the second station 2 through the first wireless communication network 100 as a communication network (step S30).

During the step S30, the wireless LAN section 11 (the watching section 13) of the first station 1 measures the level fluctuation value, which indicates the degree of the fluctuation of the electric field intensity of electromagnetic wave received from the first wireless communication network 100, more than once (step S31). Then, the wireless LAN section 11 (the watching section 13) of the first station 1 calculates an average level fluctuation value (an average value) based on the plurality of the level fluctuation values measured in the step S31 (step S32). The control section 14 of the first station 1 compares the average level fluctuation value with a set level fluctuation value (step S33).

When the average level fluctuation value is less than the set level fluctuation value (step S33—YES) based on the comparison result, the first station 1 carries out the step S30 and the wireless LAN section 11 (the communication section 12) of the first station 1 continues the wireless LAN communication with the second station 2 through the first wireless communication network 100.

When the average level fluctuation value is equal to or more than the set level fluctuation value (step S33—NO) based on the comparison result, the control section 14 of the first station 1 controls the PHS section 15 (the communication section 16) such that the PHS section 15 sends a first communication request signal 33 to the second station 2 through the second wireless communication network 200 (step S34). The first communication request signal 33 indicates a request for the changeover of the communication network from the first wireless communication network 100 to the second wireless communication network 200.

During the step S30, the PHS section 15 (the communication section 16) of the second station 2 receives the first communication request signal 33 sent by the first station 1. Then, the PHS section 15 of the second station 2 measures the level fluctuation value, which indicates the degree of the fluctuation of the electric field intensity of electromagnetic wave received from the second wireless communication network 200, more than once (step S35). Then, the PHS section 15 (the watching section 17) of the second station 2 calculates an average level fluctuation value (an average value) based on the plurality of the level fluctuation values measured in the step S35 (step S36). The control section 14 of the second station 2 compares the average level fluctuation value with a set level fluctuation value (step S37).

When the average level fluctuation value is less than the set level fluctuation value (step S37—YES) based on the comparison result, the control section 14 of the second station 2 controls the PHS section 15 (the communication section 16) such that the PHS section 15 sends a first communication request answer signal 34 to the first station 1 through the second wireless communication network 200 (step S38). In this case, the first communication request answer signal 34 indicates an answer that the second station 2 can communicate with the first station 1 through the second wireless communication network 200.

When the PHS section 15 (the communication section 16) of the first station 1 receives the first communication request answer signal 34 which is a reply to the first communication request signal 33 (step S39—YES), the control section 14 of the first station 1 cuts and ends the wireless LAN communication between the wireless LAN section 11 of the first station 1 and the second station 2. At the same time, the control section 14 also changes over from the first wireless communication network 100 to the second wireless communication network 200 (step S40). The PHS section 15 (the communication section 16) of the first station 1 carries out the PHS communication with the second station 2 through the second wireless communication network 200 (step S41).

When the average level fluctuation value is equal to or more than the set level fluctuation value (step S37—NO) based on the comparison result, the second station 2 can not send the first communication request answer signal 34, and the first station 1 can not receive the first communication request answer signal 34. Therefore, the wireless LAN section 11 (the communication section 12) of the first station 1 continues the wireless LAN communication with the second station 2 through the first wireless communication network 100 (step S30).

As for the judgement in the step S33, it is easy to realize that the first station 1 performs the step S34 when the average level fluctuation value is equal to or less than the set level fluctuation value (step S33—NO), and the step S30 when the average level fluctuation value is more than the set level fluctuation value (step S33—YES).

As for the judgement in the step S37, it is easy to realize that the second station 2 performs the step S38 when the average level fluctuation value is equal to or less than the set level fluctuation value (step S17—YES), and the step S30 when the average level fluctuation value is more than the set level fluctuation value (step S37—NO).

In this way, the automatic changeover method of communication networks of the third embodiment according to the present invention can automatically change over from the wireless LAN communication (the first wireless communication network 100) to the PHS communication (the second wireless communication network 200), when the electric field intensity of electromagnetic wave from the first wireless communication network 100 decreases and when the electric field intensity of electromagnetic wave from the first wireless communication network 200 is stable. As a result, a user of the first station 1 can carry out the communication without being conscious of the condition of the electromagnetic wave. Therefore, the communication quality doesn't decline.

The automatic changeover method of communication networks of the third embodiment changes over from the wireless LAN communication (the first wireless communication network 100) to the PHS communication (the second wireless communication network 200). Therefore, until the electric field intensity of electromagnetic wave from the first wireless communication network 100 decreases, the user of the first station can use preferentially the wireless LAN communication, of which the communication charge is more inexpensive (cheaper) than that of the PHS communication. That is, the lower-cost communication method has a priority for performing the communication over other communication methods.

The automatic changeover method of communication networks of the third embodiment has higher reliability of the comparison between the measurement value (the level fluctuation values and the set value (the set fluctuation value) and the judgement, same as the first embodiment.

(The Fourth Embodiment)

Figure 7:
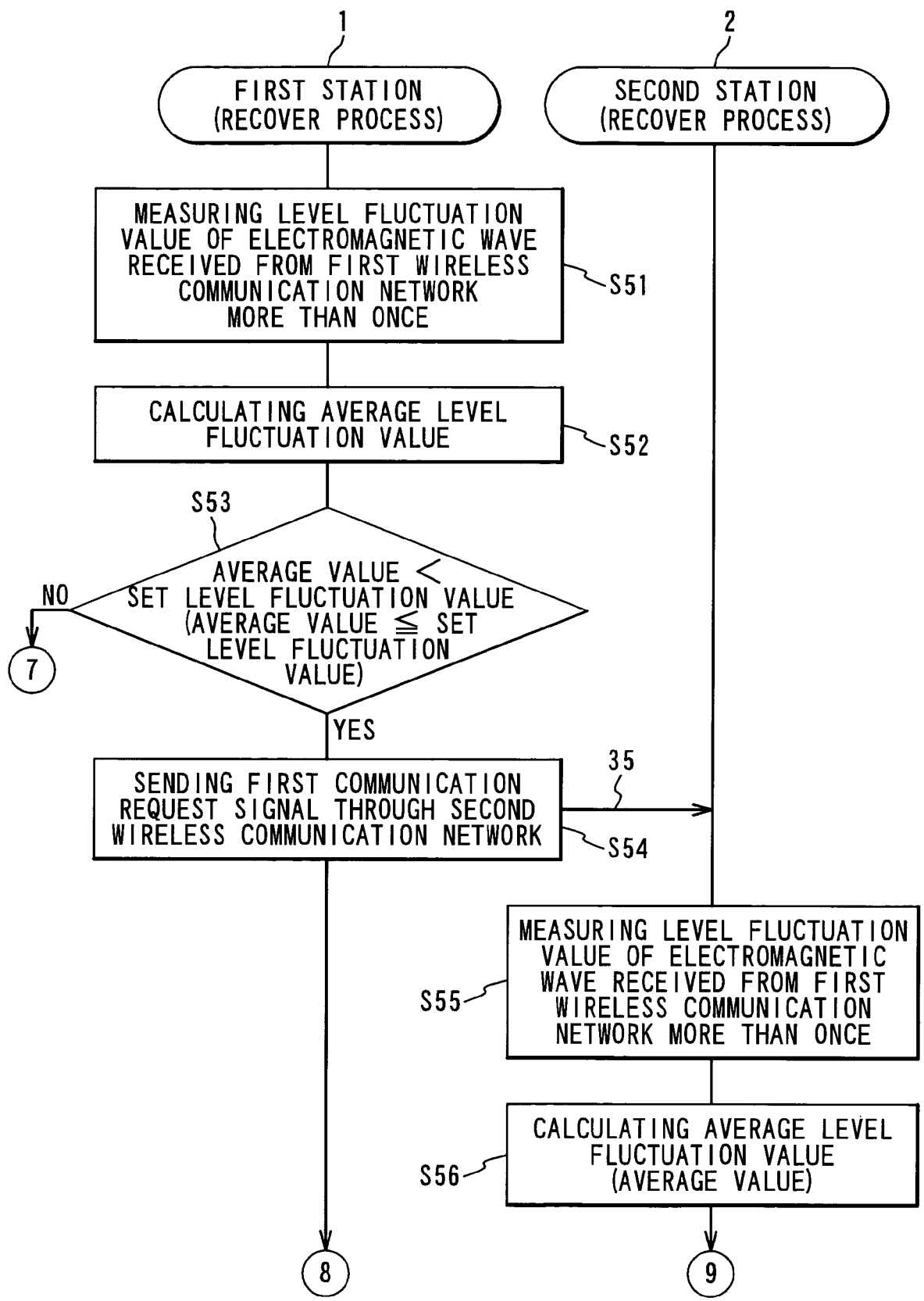
FIGS. 7 and 8 are views showing flowcharts of fourth embodiment of the automatic changeover method of communication networks according to the present invention.
Figure 8:
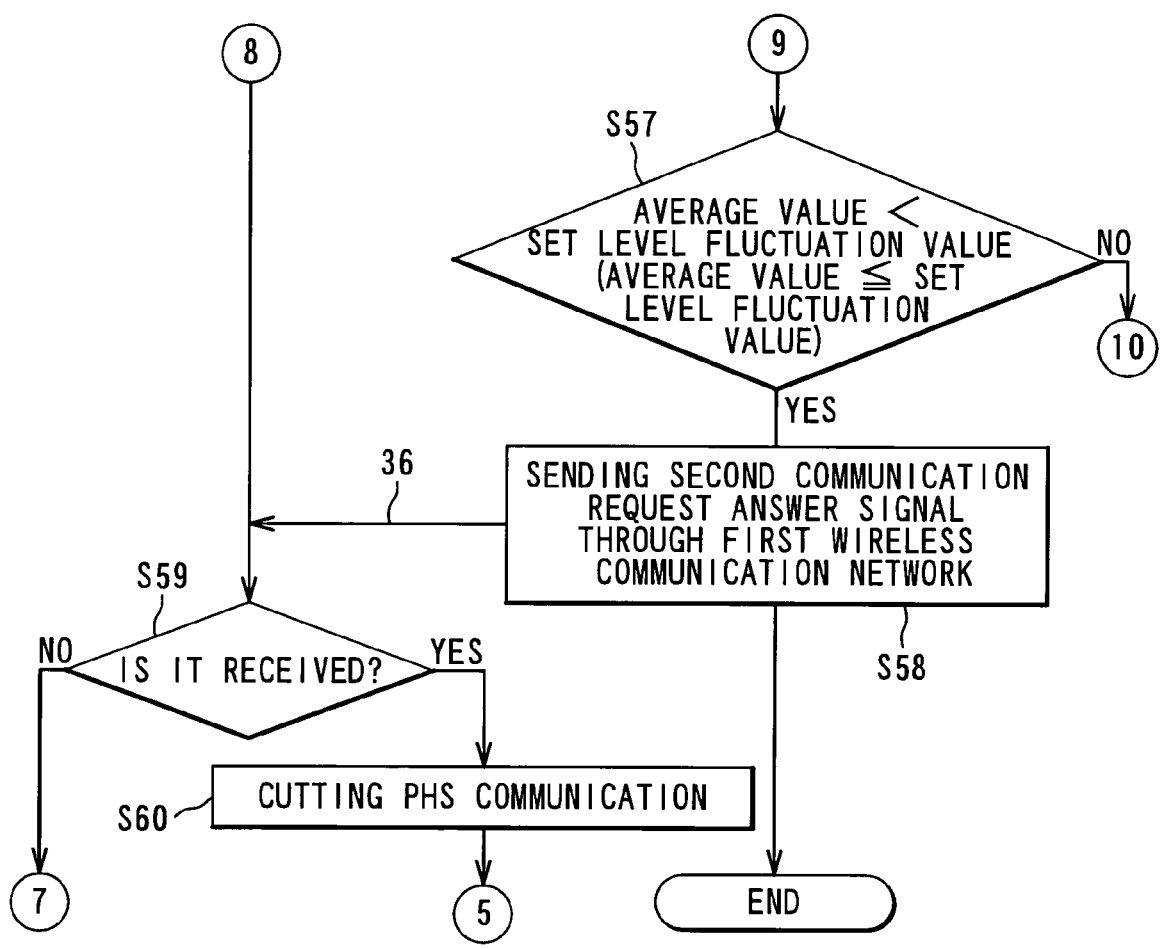

FIGS. 7 and 8 are views showing flowcharts of this embodiment of the automatic changeover method of communication networks (the operation (the recover process: from the PHS communication to the wireless LAN communication) of the automatic changeover system) according to the present invention. FIGS. 5 and 6 are also related to the fourth embodiment. During the continuation process of the step S41 in the third embodiment, the wireless LAN section 11 (the watching section 13) of the first station 1 measures the level fluctuation value, which indicates the degree of the fluctuation of the electric field intensity of electromagnetic wave received from the first wireless communication network 100, more than once (step S51). Then, the wireless LAN section 11 (the watching section 13) of the first station 1 calculates an average level fluctuation value (an average value) based on the plurality of the level fluctuation values measured in the step S51 (step S52). The control section 14 of the first station 1 compares the average level fluctuation value with a set level fluctuation value (step S53).

When the average level fluctuation value is equal to or more than the set level fluctuation value (step S53—NO) based on the comparison result, the first station 1 carries out the step S41, and the PHS section 15 (the communication section 16) continues the PHS communication which the second station 2 through the second wireless communication network 200.

When the average level fluctuation value is less than the set level fluctuation value (step S53—YES) based on the comparison result, the control section 14 of the first station 1 controls the wireless LAN section 11 (the communication section 12) such that the wireless LAN section 11 sends a second communication request signal 35 to the second station 2 through the first wireless communication network 100 (step S54). In this case, the second communication request signal 35 indicates an request for the changeover of the communication network from the second wireless communication network 200 to the first wireless communication network 100.

The wireless LAN section 11 (the communication section 12) of the second station 2 receives the second communication request signal 35 sent by the first station 1. Then, the wireless LAN section 11 of the second station 2 measures the level fluctuation value, which indicates the degree of the fluctuation of the electric field intensity of electromagnetic wave received from the first wireless communication network 100, more than once (step S55). Then, the wireless LAN section 11 (the watching section 13) of the second station 2 calculates an average level fluctuation value (an average value) based on the plurality of the level fluctuation values measured in the step S55 (step S56). The control section 14 of the second station 2 compares the average level fluctuation value with a set level fluctuation value (step S57).

When the average level fluctuation value is less than the set level fluctuation value (step S57—YES) based on the comparison result, the control section 14 of the second station 2 controls the wireless LAN section 11 (the communication section 12) such that the wireless LAN section 11 sends a second communication request answer signal 36 to the first station 1 through the first wireless communication network 100 (step S58). In this case, the second communication request answer signal 36 indicates an answer that the second station 2 can communicate with the first station 1 through the first wireless communication network 100.

When the wireless LAN section 11 (the communication section 12) of the first station 1 receives the second communication request answer signal 36 which is a reply to the second communication request signal 35 (step S59—YES), the control section 14 of the first station 1 cuts the PHS communication between the PHS section 15 of the first station 1 and the second station 2. At the same time, the control section 14 also changes over from the second wireless communication network 200 to the first wireless communication network 100 (step S60). The wireless LAN section 11 (the communication section 12) of the first station 1 carries out the wireless LAN communication with the second station 2 through the first wireless communication network 100 (step S30).

When the average level fluctuation value is equal to or more than the set level fluctuation value (step S57—NO) based on the comparison result, the second station 2 can not send the second communication request answer signal 36, and the first station 1 can not receive the second communication request answer signal 36. Therefore, the PHS section 15 (the communication section 16) of the first station 1 continues the PHS communication with the second station 2 through the second wireless communication network 200 (step S41).

As for the judgement in the step S53, it is easy to realize that the first station 1 performs the step S54 when the average level fluctuation value is equal to or less than the set level fluctuation value (step S53—YES), and the step S41 when the average level fluctuation value is more than the set level fluctuation value (step S53—NO).

As for the judgement in the step S57, it is easy to realize that the second station 2 performs the step S58 when the average level fluctuation value is equal to or less than the set level fluctuation value (step S57—YES), and the step S41 when the average level fluctuation value is more than the set level fluctuation value (step S57—NO).

In this way, the automatic changeover method of communication networks of the fourth embodiment according to the present invention can automatically change over from the PHS communication (the second wireless communication network 200) to the wireless LAN communication (the first wireless communication network 100), when the electric field intensity of electromagnetic wave from the first wireless communication network 100 is recovered or is stable. As a result, a user of the first station 1 can carry out the communication without being conscious of the condition of the electromagnetic wave. Therefore, the communication quality doesn't decline.

The automatic changeover method of communication networks of the fourth embodiment changes over from the PHS communication (the second wireless communication network 200) to the wireless LAN communication (the first wireless communication network 100). Therefore, the user of the first station can use preferentially the wireless LAN communication, of which the communication charge is more inexpensive (cheaper) than that of the PHS communication. That is, the lower-cost communication method has a priority for performing the communication over other communication methods.

The automatic changeover method of communication networks of the fourth embodiment has higher reliability of the comparison between the measurement value (the level fluctuation values and the set value (the set fluctuation value) and the judgement, same as the first embodiment.

The automatic changeover method of communication networks of the first to fourth embodiments, PHS (personal handyphone system) communication network may be substituted by the cellular telephone communication network. In this case, the first and second station may include a cellular section which has the similar function to the PHS section except for the communication type.

The automatic changeover system and the automatic changeover method enable users to carry out the communication without being conscious of the condition of the electromagnetic wave.

In the automatic changeover system and the automatic changeover method, the lower-cost communication method has a priority for performing the communication over other communication methods.

What is claimed is:

1. An automatic changeover method of communication networks comprising:
    (a) communicating with a second station by a first station through a first wireless communication network;
    (b) measuring a first level fluctuation value more than once by said first station, wherein said first level fluctuation value indicates a fluctuation degree of electric field intensity of an electromagnetic wave received from said first wireless communication network;
    (c) calculating a first average level fluctuation value by said first station, wherein said first average level fluctuation value is an average of a plurality of said first level fluctuation values; and
    (d) changing over from said first wireless communication network to a second wireless communication network by said first station, based on said first average level fluctuation value.

2. The method according to claim 1, wherein said first wireless communication network is a network for a wireless LAN (Local Area Network), and said second wireless communication network is a network for a PHS (personal Handyphone System).

3. The method according to claim 2, wherein said step (d) comprising:
    (d3) comparing said first average level fluctuation value with a first setting value by said first station; and
    (d4) changing over from said first wireless communication network to said second wireless communication network by said first station based on a first result of said comparison.

4. The method according to claim 3, wherein said step (d4) comprising:

(d41) sending a first communication request signal to said second station by said first station through said second wireless communication network based on said first result of said comparison, wherein said first communication request signal indicates a request for a changeover from said first wireless communication network to said second wireless communication network; and (d42) ending a communication through said first wireless communication network and starting a communication with said second station by said first station through said second wireless communication network, when said first station receives a first communication answer signal from said second station through said second wireless communication network, wherein said first communication answer signal indicates an answer that said second station can communicate through said second wireless communication network.

5. The method according to claim 2, further comprising:

(i) measuring a second level fluctuation value more than once by said first station, wherein said second level fluctuation value indicates a fluctuation degree of electric field intensity of an electromagnetic wave received from said first wireless communication network during communicating with said second station through said second wireless communication network;

(j) calculating a second average level fluctuation value by said first station, wherein said second average level fluctuation value is an average of a plurality of said second level fluctuation values;

(k) sending a second communication request signal to said second station by said first station through said first wireless communication network based on said second average level fluctuation value, wherein said second communication request signal indicates an request for the changeover from said second wireless communication network to said first wireless communication network; and (l) ending a communication through said second wireless communication network and starting a communication with said second station by said first station through said first wireless communication network, when said first station receives a second communication answer signal from said second station through said first wireless communication network, wherein said second communication answer signal indicates an answer that said second station can communicate through said first wireless communication network.

6. The method according to claim 2, wherein said step (a) comprising:

(a5) measuring a third level fluctuation value more than once by said first station, wherein said third level fluctuation value indicates a fluctuation degree of electric field intensity of an electromagnetic wave received from said first wireless communication network before communicating with said second station;

(a6) calculating a third average level fluctuation value by said first station, wherein said third average level fluctuation value is an average of a plurality of said third level fluctuation values;

(a7) sending a first inquiry signal to said second station by said first station through said first wireless communication network based on said third average level fluctuation value, wherein said first inquiry signal indicates an inquiry whether or not said second station can communicate through said first wireless communication network; and (a8) starting a communication with said second station by said first station through said first wireless communication network, when said first station receives a first answer signal from said second station through said first wireless communication network, wherein said first answer signal indicates an answer that said second station can communicate through said first wireless communication network.

7. The method according to claim 1, wherein said step (d) comprising:

(d1) comparing said first average level fluctuation value with a first setting value by said first station; and (d2) changing over from said first wireless communication network to said second wireless communication network by said first station based on a first result of said comparison.

8. The method according to claim 7, wherein said step (d2) comprising:

(d21) sending a first communication request signal to said second station by said first station through said second wireless communication network based on said first result of said comparison, wherein said first communication request signal indicates a request for a changeover from said first wireless communication network to said second wireless communication network; and (d22) ending a communication through said first wireless communication network and starting a communication with said second station by said first station through said second wireless communication network, when said first station receives a first communication answer signal from said second station through said second wireless communication network, wherein said first communication answer signal indicates an answer that said second station can communicate through said second wireless communication network.

9. The method according to claim 1, further comprising:

(e) measuring a second level fluctuation value more than once by said first station, wherein said second level fluctuation value indicates a fluctuation degree of electric field intensity of an electromagnetic wave received from said first wireless communication network during communicating with said second station through said second wireless communication network;

(f) calculating a second average level fluctuation value by said first station, wherein said second average level fluctuation value is an average of a plurality of said second level fluctuation values;

(g) sending a second communication request signal to said second station by said first station through said first wireless communication network based on said second average level fluctuation value, wherein said second communication request signal indicates an request for the changeover from said second wireless communication network to said first wireless communication network; and (h) ending a communication through said second wireless communication network and starting a communication with said second station by said first station through said first wireless communication network, when said first station receives a second communication answer signal from said second station through said first wireless communication network, wherein said second communication answer signal indicates an answer that said second station can communicate through said first wireless communication network.

10. The method according to claim 1, wherein said step (a) comprising:
- (a1) measuring a third level fluctuation value more than once by said first station, wherein said third level fluctuation value indicates a fluctuation degree of electric field intensity of an electromagnetic wave received from said first wireless communication network before communicating with said second station;
- (a2) calculating a third average level fluctuation value by said first station, wherein said third average level fluctuation value is an average of a plurality of said third level fluctuation values;
- (a3) sending a first inquiry signal to said second station by said first station through said first wireless communication network based on said third average level fluctuation value, wherein said first inquiry signal indicates an inquiry whether or not said second station can communicate through said first wireless communication network; and
- (a4) starting a communication with said second station by said first station through said first wireless communication network, when said first station receives a first answer signal from said second station through said first wireless communication network, wherein said first answer signal indicates an answer that said second station can communicate through said first wireless communication network.

11. An automatic changeover method of communication networks comprising:
- (m) measuring a first level fluctuation value more than once by a first station, wherein said first level fluctuation value indicates a fluctuation degree of electric field intensity of an electromagnetic wave received from a first wireless communication network;
- (n) calculating a first average level fluctuation value by said first station, wherein said first average level fluctuation value is an average of a plurality of said first level fluctuation values;
- (o) sending a first inquiry signal to a second station by said first station through said first wireless communication network based on said first average level fluctuation value, wherein said first inquiry signal indicates an inquiry whether or not said second station can communicate through said first wireless communication network;
- (p) communicating with said second station by said first station through said first wireless communication network, when said first station receives a first answer signal from said second station through said first wireless communication network, wherein said first answer signal indicates an answer that said second station can communicate through said first wireless communication network; and
- (q) communicating with said second station by said first station through a second wireless communication network, when said first station receives a second answer signal from said second station through said first wireless communication network, wherein said second answer signal indicates an answer that said second station cannot communicate through said first wireless communication network, or when said first station does not receives any answer signal within a certain time period.

12. The method according to claim 11, wherein said first wireless communication network is a network for a wireless LAN (Local Area Network), and said second wireless communication network is a network for a PHS (personal Handyphone System).

13. The method according to claim 12, wherein said step (g) comprising:
- (o1) comparing said first average level fluctuation value with a first setting value by said first station; and
- (o2) sending a first inquiry signal to a second station by said first station through said first wireless communication network based on a result of said comparison.

14. A computer program product embodied on a computer-readable medium and comprising code that, when executed, causes a computer of a first station to perform the following:
- (a) communicating with a second station through a first wireless communication network;
- (b) measuring a first level fluctuation value more than once, wherein said first level fluctuation value indicates a fluctuation degree of electric field intensity of an electromagnetic wave received from said first wireless communication network;
- (c) calculating a first average level fluctuation value, wherein said first average level fluctuation value is an average of a plurality of said first level fluctuation values; and
- (d) changing over from said first wireless communication network to a second wireless communication network, based on said first average level fluctuation value.

15. The computer program product according to claim 14, wherein said first wireless communication network is a network for a wireless LAN (Local Area Network), and said second wireless communication network is a network for a PHS (personal Handyphone System).

16. The computer program product according to claim 15, wherein said step (d) comprising:
- (d3) comparing said first average level fluctuation value with a first setting value; and
- (d4) changing over from said first wireless communication network to said second wireless communication network based on a first result of said comparison.

17. The computer program product according to claim 16, wherein said step (d4) comprising:
- (d41) sending a first communication request signal to said second station through said second wireless communication network based on said first result of said comparison, wherein said first communication request signal indicates a request for a changeover from said first wireless communication network to said second wireless communication network; and
- (d42) ending a communication through said first wireless communication network and starting a communication with said second station through said second wireless communication network, when said first station receives a first communication answer signal from said second station through said second wireless communication network, wherein said first communication answer signal indicates an answer that said second station can communicate through said second wireless communication network.

18. The computer program product according to claim 15, further comprising:
- (i) measuring a second level fluctuation value more than once, wherein said second level fluctuation value indicates a fluctuation degree of electric field intensity of an electromagnetic wave received from said first wireless communication network during communicating with said second station through said second wireless communication network;

(j) calculating a second average level fluctuation value, wherein said second average level fluctuation value is an average of a plurality of said second level fluctuation values;

(k) sending a second communication request signal to said second station through said first wireless communication network based on said second average level fluctuation value, wherein said second communication request signal indicates an request for the changeover from said second wireless communication network to said first wireless communication network; and (l) ending a communication through said second wireless communication network and starting a communication with said second station through said first wireless communication network, when said first station receives a second communication answer signal from said second station through said first wireless communication network, wherein said second communication answer signal indicates an answer that said second station can communicate through said first wireless communication network.

19. The computer program product according to claim 15, wherein said step (a) comprising:

(a5) measuring a third level fluctuation value more than once, wherein said third level fluctuation value indicates a fluctuation degree of electric field intensity of an electromagnetic wave received from said first wireless communication network before communicating with said second station;

(a6) calculating a third average level fluctuation value, wherein said third average level fluctuation value is an average of a plurality of said third level fluctuation values;

(a7) sending a first inquiry signal to said second station through said first wireless communication network based on said third average level fluctuation value, wherein said first inquiry signal indicates an inquiry whether or not said second station can communicate through said first wireless communication network; and (a8) starting a communication with said second station through said first wireless communication network, when said first station receives a first answer signal from said second station through said first wireless communication network, wherein said first answer signal indicates an answer that said second station can communicate through said first wireless communication network.

20. The computer program product according to claim 14, wherein said step (d) comprising:

(d1) comparing said first average level fluctuation value with a first setting value; and (d2) changing over from said first wireless communication network to said second wireless communication network based on a first result of said comparison.

21. The computer program product according to claim 20, wherein said step (d2) comprising:

(d21) sending a first communication request signal to said second station through said second wireless communication network based on said first result of said comparison, wherein said first communication request signal indicates a request for a changeover from said first wireless communication network to said second wireless communication network; and (d22) ending a communication through said first wireless communication network and starting a communication with said second station through said second wireless communication network, when said first station receives a first communication answer signal from said second station through said second wireless communication network, wherein said first communication answer signal indicates an answer that said second station can communicate through said second wireless communication network.

22. The computer program product according to claim 14, further comprising:

(e) measuring a second level fluctuation value more than once, wherein said second level fluctuation value indicates a fluctuation degree of electric field intensity of an electromagnetic wave received from said first wireless communication network during communicating with said second station through said second wireless communication network;

(f) calculating a second average level fluctuation value, wherein said second average level fluctuation value is an average of a plurality of said second level fluctuation values;

(g) sending a second communication request signal to said second station through said first wireless communication network based on said second average level fluctuation value, wherein said second communication request signal indicates an request for the changeover from said second wireless communication network to said first wireless communication network; and (h) ending a communication through said second wireless communication network and starting a communication with said second station through said first wireless communication network, when said first station receives a second communication answer signal from said second station through said first wireless communication network, wherein said second communication answer signal indicates an answer that said second station can communicate through said first wireless communication network.

23. The computer program product according to claim 14, wherein said step (a) comprising:

(a1) measuring a third level fluctuation value more than once, wherein said third level fluctuation value indicates a fluctuation degree of electric field intensity of an electromagnetic wave received from said first wireless communication network before communicating with said second station;

(a2) calculating a third average level fluctuation value, wherein said third average level fluctuation value is an average of a plurality of said third level fluctuation values;

(a3) sending a first inquiry signal to said second station through said first wireless communication network based on said third average level fluctuation value, wherein said first inquiry signal indicates an inquiry whether or not said second station can communicate through said first wireless communication network; and (a4) starting a communication with said second station through said first wireless communication network, when said first station receives a first answer signal from said second station through said first wireless communication network, wherein said first answer signal indicates an answer that said second station can communicate through said first wireless communication network.

24. A computer program product embodied on a computer-readable medium and comprising code that, when executed, causes a computer of a first station to perform the following:

(m) measuring a first level fluctuation value more than once, wherein said first level fluctuation value indicates a fluctuation degree of electric field intensity of an electromagnetic wave received from a first wireless communication network;

(n) calculating a first average level fluctuation value, wherein said first average level fluctuation value is an average of a plurality of said first level fluctuation values;

(o) sending a first inquiry signal to a second station through said first wireless communication network based on said first average level fluctuation value, wherein said first inquiry signal indicates an inquiry whether or not said second station can communicate through said first wireless communication network;

(p) communicating with said second station through said first wireless communication network, when said first station receives a first answer signal from said second station through said first wireless communication network, wherein said first answer signal indicates an answer that said second station can communicate through said first wireless communication network; and (q) communicating with said second station through a second wireless communication network, when said first station receives a second answer signal from said second station through said first wireless communication network, wherein said second answer signal indicates an answer that said second station cannot communicate through said first wireless communication network, or when said first station does not receives any answer signal within a certain time period.

25. The computer program product according to claim 24, wherein said first wireless communication network is a network for a wireless LAN (Local Area Network), and said second wireless communication network is a network for a PHS (personal Handyphone System).

26. The computer program product according to claim 25, wherein said step (g) comprising:

(o1) comparing said first average level fluctuation value with a first setting value; and (o2) sending a first inquiry signal to a second station through said first wireless communication network based on a result of said comparison.

27. An automatic changeover system for communication networks comprising:

a first station; and a second station;

wherein said first station communicates with said second station through a first wireless communication network, measures a first level fluctuation value more than once, calculates a first average level fluctuation value, and changes over from said first wireless communication network to a second wireless communication network based on said first average level fluctuation value, said first level fluctuation value indicates a fluctuation degree of electric field intensity of an electromagnetic wave received from said first wireless communication network, said first average level fluctuation value is an average of a plurality of said first level fluctuation values, and said first wireless communication network is a network for a wireless LAN (Local Area Network), and said second wireless communication network is a network for a PHS (personal Handyphone System).

28. An automatic changeover station for communication networks comprising:

a first communication section which communicates with another station through a first wireless communication network;

a first watching section which measures a first level fluctuation value more than once, and calculates a first average level fluctuation value, wherein said first level fluctuation value indicates a fluctuation degree of electric field intensity of an electromagnetic wave received from said first wireless communication network and said first average level fluctuation value is an average of a plurality of said first level fluctuation values;

a second communication section which has a function to communicate with said another station through a second wireless communication network; and a control section which controls said first communication section and said second communication section to change over from said first wireless communication network to said second wireless communication network based on said first average level fluctuation value.

29. The automatic changeover station according to claim 28, wherein said first wireless communication network is a network for a wireless LAN (Local Area Network), and said second wireless communication network is a network for a PHS (personal Handyphone System).

30. The automatic changeover station according to claim 28, wherein said control section compares said first average level fluctuation value with a first setting value, and said control section controls said first communication section and said second communication section such that said first communication section cuts said communication with said another station through said first wireless communication network, and said second communication section starts communication with said another station through said second wireless communication network based on a first result of said comparison.

31. The automatic changeover station according to claim 30, wherein said second communication section sends a first communication request signal to said another station through said second wireless communication network based on said first result of said comparison, said first communication request signal indicates a request for a changeover from said first wireless communication network to said second wireless communication network, said first communication section cuts a communication through said first wireless communication network, when said second station receives a first communication answer signal from said another station through said second wireless communication network, wherein said first communication answer signal indicates an answer that said second station can communicate through said second wireless communication network, and said second communication section starts a communication with said another station through said second wireless communication network.

32. The automatic changeover station according to claim 28, wherein said first watching section measures a second level fluctuation value more than once, wherein said second level fluctuation value indicates a fluctuation degree of electric field intensity of an electromagnetic wave received from said first wireless communication network during communicating with said another station through said second wireless communication network, said first watching section calculates a second average level fluctuation value by said first station, wherein said second average level fluctuation value is an average of a plurality of said second level fluctuation values, said control section controls said first communication section such that said first communication section sends a second communication request signal to said another station through said first wireless communication network based on said second average level fluctuation value, wherein said second communication request signal indicates an request for the changeover from said second wireless communication network to said first wireless communication network, and said control section controls said second communication section such that said second communication section ends a communication through said second wireless communication network and starts a communication with said another station through said first wireless communication network, when first communication section receives a second communication answer signal from said another station through said first wireless communication network, wherein said second communication answer signal indicates an answer that said another station can communicate through said first wireless communication network.

* * * * *